May 7, 1929.  F. B. MILLER  1,712,354
CONTAINER
Filed June 14, 1927
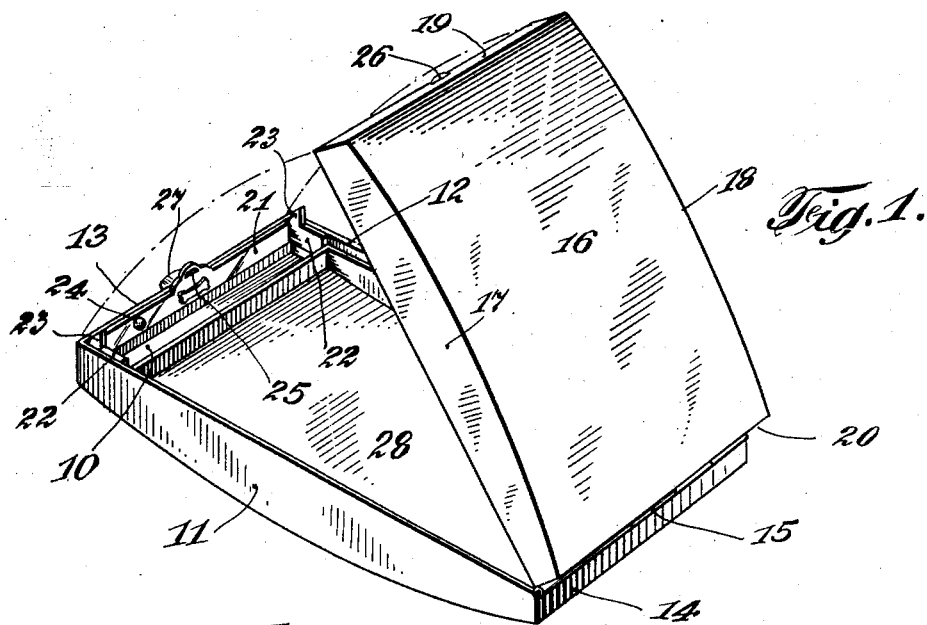
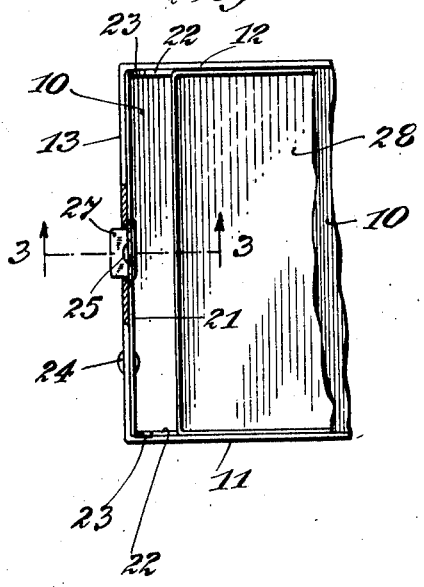
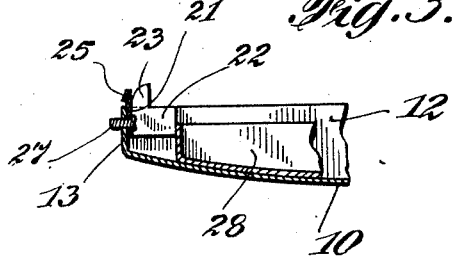
INVENTOR
Felix B. Miller,
BY
Horace Freeman
his ATTORNEY Patented May 7, 1929.

1,712,354

UNITED STATES PATENT OFFICE.

FELIX B. MILLER, OF ATTLEBORO, MASSACHUSETTS, ASSIGNOR TO AMERICAN PERFUMERS' LABORATORIES, INC., OF NEW YORK, N. Y., A CORPORATION OF NEW YORK.

CONTAINER.

Application filed June 14, 1927. Serial No. 198,728.

My invention relates to containers and refers particularly to container devices adapted to serve for certain purposes as will be evident from the following description.

One object of my invention is a device in which a removable tray situated within a receptacle will be retained from movement therein.

Another object of my invention is a device whereby the lid, or cover, of a receptacle will be guided into proper position during its closing movement.

It is frequently desirable that a receptacle should contain a removable tray, and that there should be a space between a side of the tray and a side of the receptacle in order that the tray may be readily removed when desired. It is also desirable that the tray should be prevented from movement within the receptacle which would have a tendency to allow of its accidental displacement.

It is also desirable with containers having covers, or lids, and especially hinged covers, that the cover be guided into position for proper closing and locking during the closing movement, and that it be prevented from lateral movement; this last mentioned feature being particularly desirable in those containers in which the edges of the container sides and those of the cover sides abut upon each other.

The device of my invention possesses all of the above mentioned, and other, desirable features, as will be evident upon a consideration of my specification and its accompanying drawings.

In the accompanying drawings illustrating one form of my device, similar parts are designated by similar numerals.

Figure 1 is a perspective view of one form of my device incorporated in a container shown in open position.

Figure 2 is a top plan view of that portion of Figure 1 containing my device.

Figure 3 is a cross-section through the line 3—3 of Figure 2.

The device of my invention shown in the accompanying drawings comprises a container having a bottom 10 with the upwardly extended sides 11 and 12, and the upwardly extended ends 13 and 14. Hingedly attached to the end 14 at 15 is a cover, or lid, having the top 16, the downwardly extended sides 17 and 18 and the downwardly extended ends 19 and 20.

Fitted within the forward end portion of the bottom of the container is guard member comprising the base 21 and the two angularly positioned ends 22, 22, each end having an upwardly projecting guide 23 for purposes described later. The guard is attached to the end 13 by means of the rivet 24. A catch 25 capable of co-acting with the recess 26 of the end 19 is carried by the guard base 21. A thumb-press 27 passes through an opening in the end 13 and is riveted upon the guard base 21. A pressure upon the thumb-press 27 will release the catch 25 from within the recess 26 when the container is in closed position, allowing the cover to be raised, and the relieving of the base 21 will spring the member 27 into its outward position when the pressure is removed.

Positioned within the bottom portion of the container is a removable tray, or receptacle, 28 the sides of which abut upon the end 14, the sides 11 and 12 and the end guards 22, thus maintaining the tray from accidental movement, but allowing of its removal when desired. The guard thus aids in retaining the tray within the container and to prevent it from longitudinal movement therein.

Another property of my guard is to act as a guide for the cover during its closing movement, during which process, the inner faces of the cover sides 17 and 18 abut upon the outer faces of the guides 23, 23, thus guiding the cover into proper position for closure and assisting in maintaining the free portion of the cover from lateral movement when it is closed.

It will thus be seen that my device acts both as a means for preventing the movement of the tray within the receptacle and as a means for guiding the cover into proper closed position and for maintaining the cover from lateral movement when the receptacle is closed.

I do not limit myself to the particular size, shape, number or arrangement of parts as shown and described as these are given simply as a means for clearly describing my invention.

What I claim is:—

1. In a container, in combination, a bottom member having upwardly extended sides, a cover for said container, a removable tray within the bottom member, guide members at opposite extremities of a bottom side extending above the bottom sides and at least one said guide member abutting upon the tray.

2. In a container, in combination, a bottom member having upwardly extended sides, a hinged cover for said container, a removable tray within the bottom member, guide members at opposite extremities of a bottom side extending above the bottom sides and at least one said guide member abutting upon the tray.

3. In a container, in combination, a bottom member having upwardly extended sides, a cover for said container, a removable tray within the bottom member, guide members at opposite extremities of a bottom side at at least one said guide member abutting upon the tray, extending above the bottom sides and abutting upon the faces of cover sides when in closed position.

4. In a container, in combination, a bottom member having upwardly extended sides, a hinged cover for said container, a removable tray within the bottom member, guide members at opposite extremities of a bottom side at least one said guide member abutting upon the tray, extending above the bottom sides and abutting upon the faces of cover sides when in closed position.

Signed at Attleboro, in the county of Bristol and State of Massachusetts, this 10th day of June, 1927.

FELIX B. MILLER.